July 24, 1934.　　　A. G. HEWITT　　　1,967,773
APPARATUS FOR AND A METHOD OF DRYING CELLULOSE TUBING
Filed Nov. 26, 1930　　2 Sheets-Sheet 2
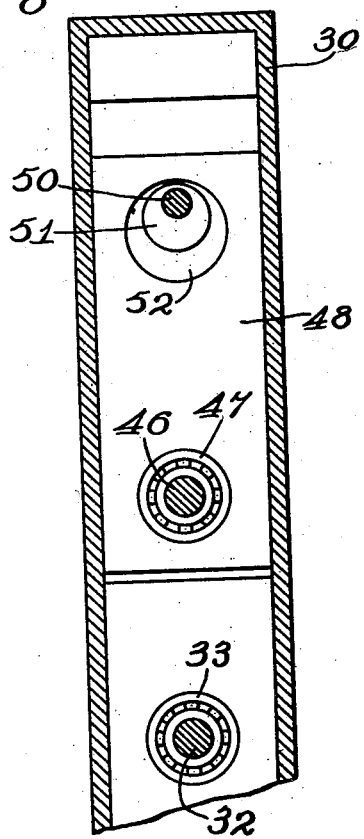
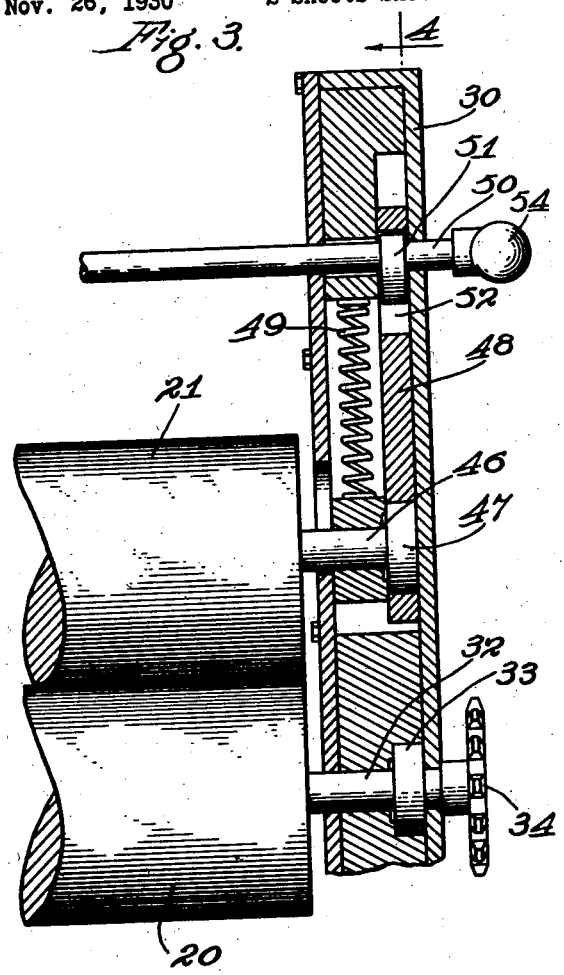
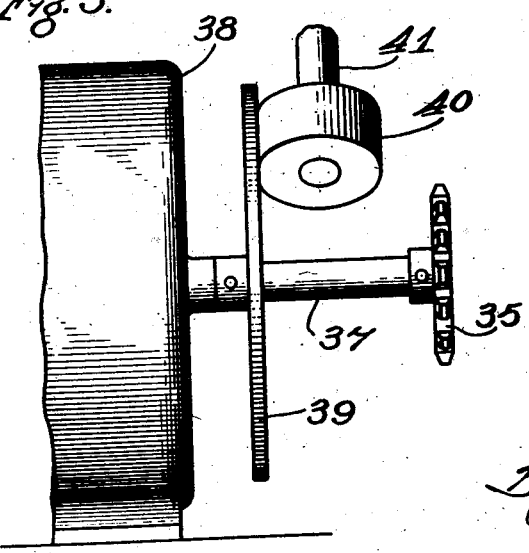
Inventor.
Alfred G. Hewitt.

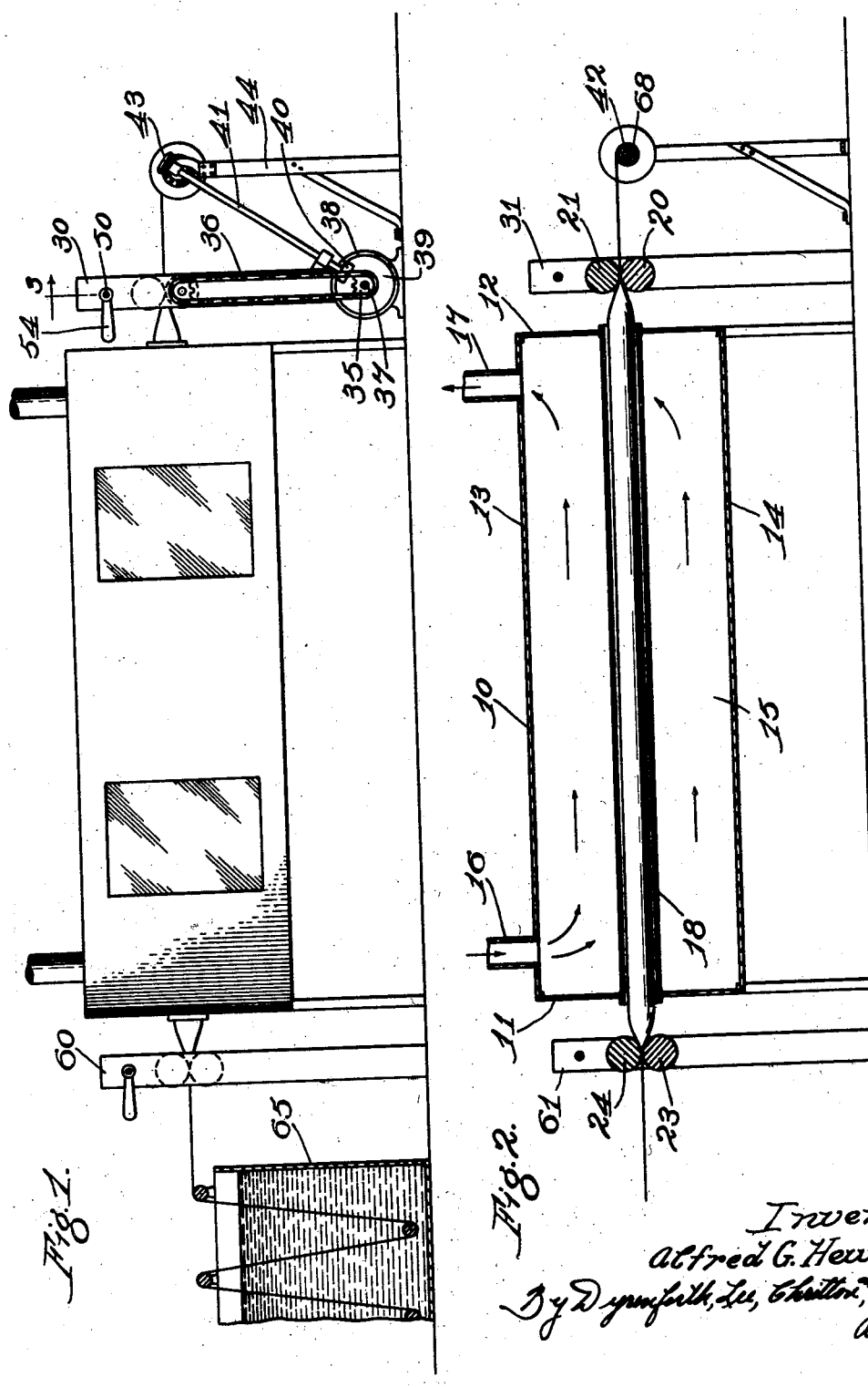

Patented July 24, 1934

1,967,773

UNITED STATES PATENT OFFICE 1,967,773

APPARATUS FOR AND A METHOD OF DRYING CELLULOSE TUBING

Alfred G. Hewitt, Chicago, Ill., assignor to The Visking Corporation, Chicago, Ill., a corporation of Virginia Application November 26, 1930, Serial No. 498,493

8 Claims. (Cl. 34—48)

The invention relates to apparatus for and a method of producing tubing, and is particularly adapted to be embodied in apparatus for producing and drying cellulose tubing, such as sausage casings, etc., which have been formed from viscose.

Cellulose sausage casings, or tubing, is formed from viscose which is obtained by practicing the method described in U. S. Letters Patent No. 1,612,508 granted to William F. Henderson and Harold E. Dietrich December 28, 1926. The viscose is extruded through an annular orifice. It is then subjected to a regenerating bath so that cellulose tubing is obtained. The tubing is then washed in water and treated with a softening agent, after which it is dried.

The primary object of the present invention is to provide means for continuously drying the tubing while it is being advanced, thus obviating the necessity of cutting it into relatively short lengths prior to the drying operation, or shirring it on mandrels during the drying operation.

Apparatus embodying a preferred form of the invention comprises a housing through which the tubing is advanced continuously, heated air being circulated through the housing to dry the tubing. Posterior and anterior of the housing are rolls which co-operate to advance the tubing and also compress it to confine a quantity of air in the tubing intermediate the rolls. The air confined within the tubing expands it and maintains it at the proper diameter during the drying operation.

Other objects and advantages will become apparent as the following description progresses, reference being had to the accompanying drawings, wherein:

Figure 1 is a side elevation of drying apparatus which embodies the invention.

Fig. 2 is a central longitudinal section taken through the improved apparatus.

Fig. 3 is an enlarged section taken on line 3—3 of Fig. 1.

Fig. 4 is a section taken on line 4—4 of Fig. 3, and

Fig. 5 is an enlarged view of a friction drive which forms part of the mechanism shown in Fig. 1.

While the invention is disclosed in connection with apparatus for producing cellulose tubing, it is to be understood that the invention is limited to such use only to the extent indicated in the appended claims.

Referring to the drawings wherein a preferred form of the invention is illustrated, the reference character 10 designates generally a housing comprising end walls 11 and 12, top and bottom walls 13 and 14 and side walls 15.

Heated air is supplied to the housing 10 by any suitable means (not shown) the heated air being discharged into the housing through a pipe 16 and being discharged therefrom through a pipe 17.

Extending between the end walls 11 and 12 is a foraminous tube 18 through which cellulose tubing is advanced and dried. The means for advancing the tubing through the foraminous tube 18 comprises a driven roll 20 and an idler roll 21 positioned adjacent the discharge end of the foraminous tube 18. Disposed adjacent the entrance of the tube 18 are idler rolls 23 and 24.

The rolls 20 and 21 are mounted between standards 30 and 31. The roll 20 is provided with trunnions 32, one of which is shown in Fig. 3. These trunnions are journaled in ball-bearings 3 mounted in the standards 30 and 31 and one of the trunnions has a sprocket gear 34 fixed to it, the sprocket gear 34 being operatively connected to a sprocket gear 35 by a sprocket chain 36. The sprocket chain 36 is fixed to a shaft 37 which is connected by reduction gearing (not shown) to an electric motor 38. Also fixed to the shaft 35 is a friction disk 39 which is engaged by a friction wheel 40 fixed to a shaft 41 which drives a shaft 42 through the medium of bevel gearing 43. The shaft 42 is mounted in standards 44.

The roll 21 is provided with trunnions 46 journaled in ball bearings 47 which are carried by slides 48, slidably journaled in the standards 30 and 31. Interposed between each of the slides 48 and its associated standard is a compression spring 49 which yieldingly urges the roll 21 against the roll 20. A shaft 50 journaled in the standards 30 and 31 is provided with eccentrics 51 disposed in apertures 52 formed in the slides 48. A handle 54 fixed to one end of the shaft 50 provides means whereby the shaft 50 may be rotated through 180° so that the eccentrics 51 will lift the slides 48 and the roll 21 so that the roll 21 will be spaced from the roll 20. The purpose of this construction will presently appear.

The rolls 23 and 24 are mounted between standards 60 and 61, the roll 23 being journaled in the standards. The roll 24 is journaled in the same manner as the roll 21 and may be lifted out of engagement with the roll 23 by means substantially identical with the means whereby the roll 21 may be lifted out of engagement with the roll 20.

The tubing is preferably fed continuously to the drying apparatus. Thus, a receptacle 65 is shown which holds the softening solution, preferably an aqueous solution of glycerine, through which the tubing passes after being extruded and regenerated. The extruding and regenerating operations are continuous, and it is readily understood that the tubing may be advanced continuously through the dryer so that it is not necessary to cut the tubing into short lengths before or after the drying operation. The apparatus operates continuously and thereby savings are effected in labor and material. The tubing is discharged from the drying apparatus in a flat condition and may be easily stored in that condition until it is to be used.

When the dried tubing passes from the rolls 20 and 21, it is preferably wound upon a cylindrical tubular mandrel 68 carried by the shaft 42, the shaft 42 being driven, as described above, through the friction gearing 39—40 so that the shaft 42 will rotate at a speed corresponding to the speed with which the dry tubing may be wound upon the mandrel as the coil of tubing on the mandrel increases in diameter. However, the tubing need not be wound upon the mandrel 68 and in that event it is apparent that the length of the tubing which is dried is not limited by any dimensions or other limitations of the apparatus.

The operation of the above described apparatus is as follows: The rolls 21 and 24 are lifted from engagement with the rolls 20 and 23, respectively, and one end of the tubing is threaded through the foraminous tube 18. The roll 24 is then rolled into engagement with the roll 23 and compressed air introduced into the forward end of the cellulose tubing to inflate it. Sufficient air is admitted to inflate the cellulose tubing to its proper diameter. The roll 21 is then lowered to bring it into engagement with the roll 20, and it is readily understood that a substantially constant quantity of air will remain in the tubing and inflate it when it is advanced through the action of the rolls 20 and 21. The roll 20 is driven, of course, by the motor 38. The forward end of the tubing is secured to the mandrel 68 so that the tubing will be wound thereon as it passes from the rolls 20 and 21.

If sufficient air escapes from within the tubing to cause the diameter of the portion being dried to decrease an undesired amount, the forward end of the tubing is severed from that on the mandrel and the roll 21 is raised to permit additional air to be introduced into the tube. It will be noted that the foraminous tube 18 is larger in diameter than the inflated cellulose tubing. This construction is preferred as it prevents the cellulose tubing from dragging on the inner surface of the foraminous tube while being advanced therethrough. It is readily understood that a bubble of air is confined in the cellulose tubing as it is advanced through the foraminous tubing and this term is employed to distinguish from the prior art wherein cellulose tubing is inflated during the drying operation by continuously introducing compressed air into the portion being dried.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I claim as new, and desire to secure by Letters Patent, is:

1. A method of producing tubing, which method includes the steps of continuously advancing and drying the tubing while inflating successive sections of it with an isolated substantially constant quantity of gas, and simultaneously and continuously flattening the dried tubing.

2. A method of producing tubing, which method includes the steps of continuously advancing and drying the tubing in an inflated condition, and simultaneously and continuously flattening the dried tubing.

3. A method of drying tubing, which method comprises inflating a section of the tubing solely with a gaseous medium, entirely collapsing the tubing at both ends of the inflated section, advancing the tubing in such manner that the gaseous medium advances bodily therethrough while remaining substantially constant in quantity, and subjecting the successively inflated portions of the tubing to a drying medium.

4. A method of drying tubing, which method comprises inflating a section of the tubing solely with a gaseous medium, advancing the tubing in such manner that the gaseous medium advances bodily therethrough while remaining substantially constant in quantity, said gaseous medium being isolated within said tubing, and subjecting the successively inflated portions of the tubing to a drying medium.

5. A method of drying a continuous length of tubing which comprises: continuously advancing a length of tubing through heated air, sealing that portion of the tubing which is entering the heated air, inflating with entrapped gas that portion of the tubing which is within the heated air, and completely deflating the tubing as it is being withdrawn from said heated air.

6. In apparatus of the character set forth: a housing through which a continuous length of tubing is fed; means at one end of said housing for sealing tubing advancing into said housing; and means for holding said tubing inflated while in said housing and for completely deflating the same while being withdrawn therefrom.

7. In apparatus of the character set forth, a housing through which an elongated tube is movable for treatment; tube collapsing means adjacent the inlet of the housing through which the tube moves and forwardly of which it is inflated; squeezer means adjacent the outlet of the housing through which said tube is threaded, said squeezer means collapsing the tube; said collapsing means and squeezer means maintaining the inflating medium entrapped in that portion of the advancing tube located between said collapsing means and squeezer means.

8. A method of drying cellulose tubing, which comprises inflating a section of a length of tubing by sealing off an isolated bubble of gas therein, advancing the tubing in such manner that the inflating gas is confined within the tubing and travels the length thereof at substantially constant pressure, and drying that portion of the tubing which is being subjected to the inflating gas.

ALFRED G. HEWITT.